Oct. 9, 1928.
F. WULFF
1,687,190
HANDLE
Filed Dec. 23, 1926
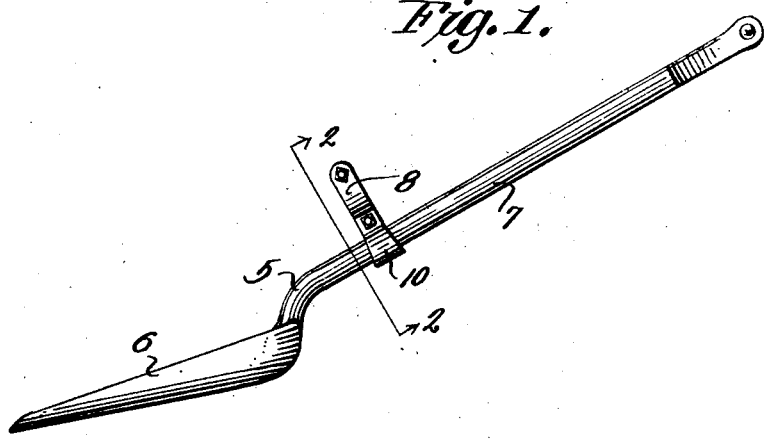
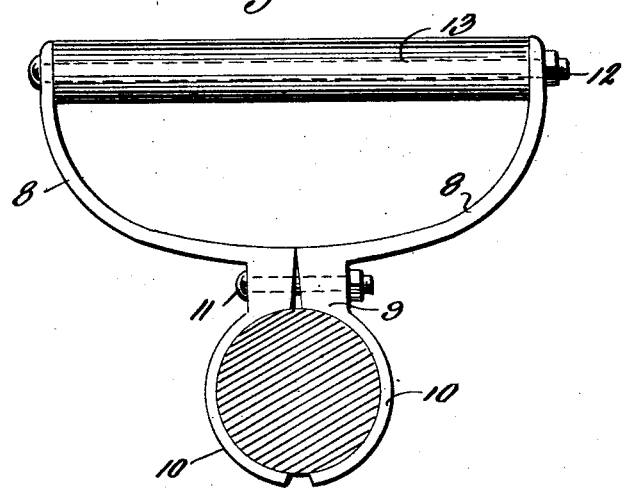
Inventor
FRED WULFF Patented Oct. 9, 1928.

1,687,190

UNITED STATES PATENT OFFICE.

FRED WULFF, OF VEGA, SOUTH DAKOTA.

HANDLE.

Application filed December 23, 1926. Serial No. 156,664.

The present invention relates to improvements in implement handles and has for its primary object to provide a detachable handle for shovels and the like.

A further object of the invention is the provision of an auxiliary handle adapted for use in connection with the lower end of a shovel handle to facilitate the lifting operation thereof.

A still further object of the invention is the provision of an auxiliary handle adapted for use in connection with shovels and similar implements which is designed for convenient attachment in association with the implement or disconnection therefrom.

Still another object of the invention is the provision of an implement handle of a detachable structure which is simple and durable of construction and which can be manufactured at a relatively low cost.

Other objects and advantages of the invention will become apparent as the description progresses.

In the accompanying drawing, forming a part of this specification and in which like reference characters are employed to designate corresponding parts throughout the same:

Figure 1 is a side elevational view of a conventional form of shovel showing my improved auxiliary handle mounted in operative position thereon, and Figure 2 is an enlarged transverse sectional view taken on the line 2—2 of Figure 1.

Referring to the drawing, wherein for the purpose of illustration is shown the preferred embodiment of my invention, the numeral 5 generally designates a conventional form of shovel embodying a scoop 6 and a longitudinal handle portion 7.

My invention essentially resides in the provision of a detachable handle member adapted to be secured on the handle member adjacent the connection of the scoop. This auxiliary handle structure is formed of two complementary sections, each section embodying an arcuate quadrant shaped bar 8 formed with radially extending connecting blocks 9 apertured transversely and having one edge formed at an angular inclination. Formed on the outer end of the block 9 is a substantially semi-circular jaw 10 adapted to embrace a shovel handle or the like.

The complementary sections are connected by means of a transverse bolt 11 shown to advantage in Figure 2, the angular sides of the blocks 9 being arranged in adjacent positions for adjustable engagement with a shovel handle.

The upper ends of the arcuate bars 8 are also apertured in transverse alignment for connection of a transverse rod 12 upon which is rotatably mounted a cylindrical handle 13. In use, the detachable handle structure is fastened at the lower end of the shovel handle as illustrated in Figure 1 by initially separating the complementary jaws 10 until the same are arranged in opposed position to embrace the handle, when the nut is tightly threaded on the bolt 11 and the jaws securely fastened in position. The shovel may then be readily used by placing one hand about the handle formed end of the shovel handle and the other hand about the cylindrical handle 13 secured upon the detachable handle structure. In this manner, the shovel can be conveniently used for shoveling grain and other matter. By grasping the auxiliary structure the workman will not feel the strain and inconvenience occasioned by grasping the lower end of the shovel handle 7.

It is to be understood that the form of my invention herewith shown and described is to be taken as the preferred example of the same, and that various changes as to the shape, size and arrangement of parts may be resorted to without departing from the spirit of the invention or the scope of the subjoined claim.

Having thus described my invention, I claim:

A detachable handle device comprising companion sections of curved formation, rockable companion blocks arranged at the opposite ends of the sections and a continuation thereof and having divergently arranged companion side walls defining a V-shaped opening between the blocks, a bolt arranged within said blocks, a handle clamped between the sections, and clamping jaws, a continuation of said blocks and projecting laterally therefrom.

In testimony whereof I affix my signature.

FRED WULFF.